United States Patent
Timenes

(10) Patent No.: US 11,144,050 B2
(45) Date of Patent: Oct. 12, 2021

(54) ROLLING ARRANGEMENT AND METHOD FOR AUTONOMOUSLY REPOSITIONING DEVICES WITH INTEGRATED ROLLING ARRANGEMENT

(71) Applicant: WHEEL.ME AS, Oslo (NO)

(72) Inventor: Atle Timenes, Snarøya (NO)

(73) Assignee: WHEEL.ME AS, Oslo (NO)

( * ) Notice: Subject to any disclaimer, the term of this patent is extended or adjusted under 35 U.S.C. 154(b) by 142 days.

(21) Appl. No.: 16/480,526

(22) PCT Filed: Jan. 29, 2018

(86) PCT No.: PCT/EP2018/052102
§ 371 (c)(1),
(2) Date: Jul. 24, 2019

(87) PCT Pub. No.: WO2018/138320
PCT Pub. Date: Aug. 2, 2018

(65) Prior Publication Data
US 2019/0384281 A1    Dec. 19, 2019

(30) Foreign Application Priority Data

Jan. 27, 2017  (EP) .................................. 17153510

(51) Int. Cl.
*G05D 1/00* (2006.01)
*A47B 91/06* (2006.01)
*B60B 33/08* (2006.01)

(52) U.S. Cl.
CPC ........... *G05D 1/0027* (2013.01); *A47B 91/06* (2013.01); *B60B 33/08* (2013.01); *G05D 1/0016* (2013.01)

(58) Field of Classification Search
CPC ............... G05D 1/0027; G05D 1/0016; G05D 2201/0211; G05D 1/028; G05D 1/0295; A47B 91/06; B60B 33/08
(Continued)

(56) References Cited

U.S. PATENT DOCUMENTS

| 6,292,713 | B1 * | 9/2001 | Jouppi | G06F 3/011 |
| | | | | 345/629 |
| 2006/0112514 | A1 * | 6/2006 | Libakken | B60B 33/08 |
| | | | | 16/21 |
| 2010/0082156 | A1 * | 4/2010 | Root | G05D 1/0038 |
| | | | | 700/264 |

FOREIGN PATENT DOCUMENTS

| JP | 2007-148583 | 6/2007 |
| JP | 2016-224854 | 12/2016 |
| WO | 2015/118492 | 8/2015 |

OTHER PUBLICATIONS

Wang et al., Realizing Cooperative Object Manipulation using Multiple Behavior-based Robots, IROS 96, Proceedings of the 1996 L.EEE/RSJ International Conference in Osaka, Japan Nov. 4-8, 1 m New York, NY, vol. 1, Nov. 4, 1996, pp. 310-317, X010212395.*

(Continued)

*Primary Examiner* — Muhammad Shafi
(74) *Attorney, Agent, or Firm* — Wenderoth, Lind & Ponack, L.L.P.

(57) ABSTRACT

A rolling arrangement and a method enable autonomous movement of a device from a first position to a second position along a surface when the rolling arrangement is integrated in the device. The rolling arrangement includes a wireless receiver, a control device, a position acquirer, a driver for driving a rolling element, and a power supply for providing power to the wireless receiver, the control device, the position acquirer, and the driver.

14 Claims, 1 Drawing Sheet

(58) Field of Classification Search
USPC .............................................................. 701/2
See application file for complete search history.

(56) References Cited

OTHER PUBLICATIONS

International Search Report dated Apr. 16, 2018 in International (PCT) Application No. PCT/EP2018/052102.
ZhiDong Wang et al., "Realizing Cooperative Object Manipulation using Multiple Behavior-based Robots", IROS 96, Proceedings of the 1996 L EEE/RSJ International Conference on Osaka, Japan Nov. 4-8, 1m New York, NY, vol. 1, Nov. 4, 1996, pp. 310-317, XP010212395.
T. Sugar et al., Coordination of Multiple Mobile Manipulators, Proceedings of the 2001 IEEE International Conference on Robotics & Automation, Seoul, Korea, May 21-26, 2001, [Proceedings of the IEEE International Conference on Robotic & Automation], New York, NY, vol. 3, May 21, 2001, pp. 3022-3027, XP010550602.
Aram Zaerpoora et al., "Distributed object transportation on a desired path based on Constrain and Move strategy", Robotic and Autonomous Systems, Elsevier, vol. 50, No. 2-3, Feb. 28, 2005, pp. 115-128, XP027792817.
Kazuhiro Kosuge et al., "Coordinate Motion Control of Multiple Autonomous Mobile Robots Based on Compliant Motion Control", Jan. 1, 1998, Distributed Autonomous Robotics Systems 3, pp. 141-150, XP009194918.

* cited by examiner

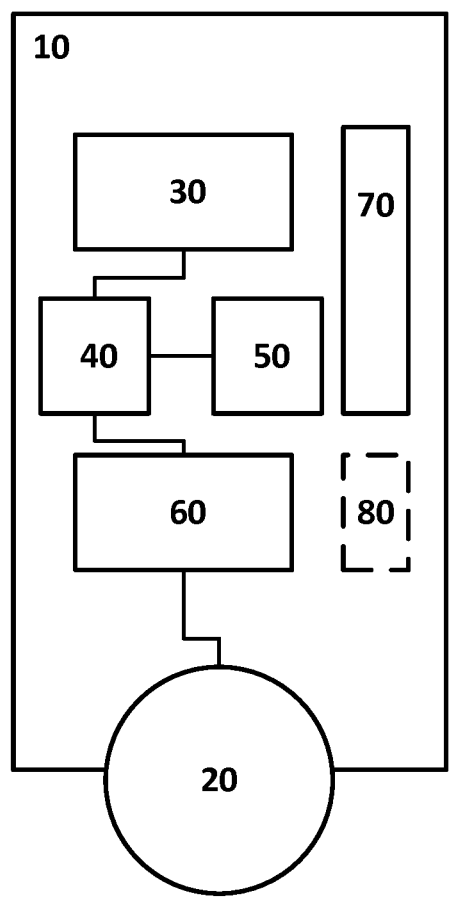

ROLLING ARRANGEMENT AND METHOD FOR AUTONOMOUSLY REPOSITIONING DEVICES WITH INTEGRATED ROLLING ARRANGEMENT

BACKGROUND OF THE INVENTION

1. Field of the Invention

The present invention relates to a remotely controlled rolling arrangement to be integrated in a device for moving the device along a surface. The invention further relates to a method and system for automatically moving a group of devices according to pre-set scenarios. The devices to be moved can for instance be furnishings and wall elements.

2. Description of the Related Art

In many instances, it is necessary to move furnishings to gain access to the floor space where furnishings are placed. The reason may for instance be for cleaning the floor space where the furnishings where placed. To make it easier to move the piece of furniture, the piece of furniture may be provided with different types of wheels.

There are also other types of devices which can be provided with wheels that facilitate moving. These devices may for instance be lightweight partition walls. By moving such, an interior floor plan layout can be changed. Other cases where it may be desirable to move similar structural elements are also conceivable.

The applicant has previously developed a rolling device capable of being integrated in devices, such as a piece of furniture, a movable wall etc., for moving the device along a surface, and which can be used by everyone regardless of physical condition and capacity to lift different devices in which the rolling device is integrated. This device is described in Norwegian Patent NO 316760 B1.

Said rolling device comprises a cylindrical sleeve device that is arranged in, for example, the leg of a piece of furniture, and a piston that is movably arranged in the cylindrical sleeve device. A ball-shaped or spherical wheel is arranged in the piston. The piston is movable, with the aid of a click system comprising a spring, between an upper position and a lower position. When the piston is in the lower position, the piece of furniture can be rolled across the floor it is standing on, whilst when the piston is in the upper position, the wheel is inside the cylindrical sleeve device and the leg of the piece of furniture, in which the rolling device is arranged, thus stands on the floor. The piece of furniture thus stands in the desired position without rolling inadvertently across the floor when small forces are applied to the piece of furniture. The solution is completely mechanical.

The applicant has further developed the concept and provided a rolling device with an automatic actuator system for moving a piston with a rolling element between an upper and lower position. The upper position is a passive stationary position, and the lower position is an active position for moving the rolling device along a surface. The actuator can be wirelessly controlled.

Even though the rolling device can be remotely operated to move between an upper and lower position as described above, the rolling device still must be pushed or guided in a desired direction for moving it between different positions on a surface.

The present invention is a further development of the concept, where a rolling device is controlled for moving automatically from one position to another.

Different devices for manipulating and moving objects are described in prior art. One example is a trolley on wheels. This can be used for carrying and moving different objects. The trolley can be remotely controlled or it can follow pre-set routes according to for instance guides on a floor in an area where it is operating.

Another example is presented in the publication of Zhidong Wang et al.: "*Realizing cooperative object manipulation using multiple behaviour-based robots*", Intelligent Robots and Systems '96, IROS 96, Proceedings of the 1996 L EEE/RSJ International Conference on Osaka, Japan 4-8 November 1, New York, N.Y., USA, IEEE, US, vol. 1, 4 Nov. 1996 (1996-11-04), pages 310-317, XP010212395, DOI: 10.1109/IROS.1996.570693, ISBN: 978-0-7803-3213-3.

This solution requires several co-operating external robots for moving a device or object from one position to another. The external robots must first move to the device to be moved, then get a good grip by interacting with the object, and then move it by coordinating their movements.

Prior art solutions are complex and not suited for efficient moving and rearranging of several objects in a room at the same time. They also require space in addition to the space occupied by objects to be moved.

SUMMARY OF THE INVENTION

The object of the present invention is to provide a rolling arrangement adapted for being integrated in devices, such as a piece of furniture, a movable wall etc., for autonomously moving the device along a surface from a first position to a second position.

It is also an object to provide a method for autonomously moving at least one device from a first position to a second position along a surface. This is possible by integrating the rolling arrangement according to the invention in the device to be moved. In one embodiment of the invention, a method for autonomously moving a group of devices from a first to a second position is described.

The present invention is defined by a rolling arrangement operable when integrated in a device for together making a system for autonomously moving the device from a first position to a second position along a surface. The rolling arrangement comprises a rolling element arranged at a first end portion of a housing of the rolling arrangement such that rolling element is in contact with the surface when the rolling arrangement is to be moved.

The rolling arrangement further comprises the following devices arranged in the housing of the rolling arrangement:
 a wireless receiver and a control device connected to each other;
 position means connected to the control device for acquiring the position of rolling arrangement relative to its surroundings, and
 driving means connected to the control device and the rolling element for driving and controlling the movements of the rolling element according to the first position acquired by the position means, and a received wireless signal comprising movement instructions and the second position, and
 a power supply connected to the devices arranged in the housing.

Further features of the rolling arrangement are defined in the claims.

The invention is further defined by a method for autonomously moving at least one device from a first position to a second position along a surface, the method comprises the following steps:

provide a rolling arrangement operable when integrated in the device to be moved, comprising a rolling element arranged at a first end portion of a housing of the rolling arrangement such that rolling element is in contact with the surface when the rolling arrangement is to be moved;

integrating the roller arrangement in the device to be moved for together making a system and arranging it to be in contact with the surface when the device is to be moved, and where the rolling arrangement further comprises the following devices arranged in the housing of the rolling arrangement: a wireless receiver and a control device connected to each other, position means connected to the control device for acquiring the position of the rolling arrangement relative to its surroundings, and driving means connected to the control device and the rolling element for driving and controlling the movements of the rolling element;

receiving movement instructions in the control device of the rolling arrangement by means of the wireless receiver;

letting the position means in the rolling arrangement acquire a first current position relative to its surroundings;

executing received movement instruction in the control device for controlling the movement of the rolling element, where the movements are based on said acquired first position of the rolling arrangement and the received movement instructions comprising a route and a second position, and moving the at least one rolling arrangement integrated in the device from the first to the second position according to the route.

Further features of the method are defined in the claims.

Different types of rolling arrangements for moving devices such as furnishings and wall elements exists. These arrangements can however not provide a self-driven autonomous way of rearranging and moving the devices.

An object of the present invention is to provide a rolling arrangement adapted for being integrated in devices, such as a piece of furniture, a movable wall etc., and for autonomously moving the device along a surface from a first position to a second position.

BRIEF DESCRIPTION OF THE DRAWING

The invention will now be further described with reference to the FIGURE showing the different devices comprised in the rolling arrangement according to the invention, as well as by non-limiting examples of embodiments of the subject disclosure.

The rolling arrangement 10 is connected to a device for autonomously moving the device from a first position to a second position along a surface.

FIG. 1 shows the different devices comprised in the rolling arrangement according to the invention.

DETAILED DESCRIPTION OF THE INVENTION

The rolling arrangement 10 comprises a housing, a rolling element 20 that is arranged at a first end portion of the housing and arranged to be in contact with the surface when the device is to be moved. The housing is partly hollow for holding the different devices comprised in the rolling arrangement 10.

The rolling arrangement 10 further comprises a set of different devices arranged in the housing.

One device is a wireless receiver 30 and another device is a control device 40. These are signal connected to each other such that the receiver 30 can receive wireless control signals.

Another device arranged in the housing of the rolling arrangement 10 is position means 50, connected to the control device 40, for acquiring the position of rolling arrangement 10 relative to its surroundings. There are different ways of acquiring the position.

One example is determining position from an external device observing the position of the rolling arrangement 10. The position can then be transmitted to the position means 50 of the rolling arrangement 10. Different known methods can be used for this. One example is to use a camera, preferably a 3D camera observing the device connected to the rolling arrangement 10. Another example is to use an RFID chip connected to the rolling arrangement 10 or to the device to be moved. The position can then be found by means of ultrasound. Yet another way is to apply Bluetooth indoor positioning by means of triangulation. This is possible by equipping the rolling arrangement 10 with a Bluetooth transmitter, and arranging at least three antennas in the room where the device connected to the rolling arrangement 10 is placed. These are all well-known methods and will not be described further here.

Driving means 60 are further connected to the control device 40 and the rolling element 20 for driving and controlling the movements of the rolling element 20 according to the first position acquired by the position means 50, and a received wireless signal comprising movement instructions and the second position.

Different types of known driving means for moving the rolling element 20 are feasible. In one embodiment, the rolling element is driven by one or more balls connected to a motor. In another embodiment, the rolling element 20 is driven by a chain connected to a motor. The motor is preferably an electric or electromagnetic motor.

A power supply 70 for driving the different electronic devices arranged in the housing can be provided in different ways. In one embodiment, the power is provided by a battery connected to the electronic devices. In another embodiment, the power is provided by wireless power transfer means based on time-varying electric, magnetic, or electromagnetic fields. A receiver for receiving field energy is in this embodiment placed in the housing of the rolling arrangement 10. Received field energy is then converted to an electrical current that is used as the power source for the different electronic devices arranged in the housing. In another embodiment of the invention, wireless power transfer is used for charging a battery connected to the electronic devices arranged in the housing.

In one embodiment of the invention, the rolling arrangement 10 further comprises a wireless transmitter 80. This embodiment is useful for coordinating simultaneous operation of a set of several rolling arrangements 10. How this is implemented is explained below when describing the inventive method for autonomously moving at least one device by means of the rolling arrangement 10.

In one embodiment, the rolling arrangement 10 further comprises a piston arranged reciprocally movably in the housing such that the piston can be moved between an upper and a lower position in the cylinder. In this embodiment, the rolling element 20 is connected to the piston. Details of this arrangement are described in applicants Norwegian Patent NO 316760 B1. This publication also discloses possible mechanical features of a rolling device according to the present invention.

In one embodiment, the rolling arrangement 10 is integrated in a piece of furniture, for instance a chair or table. In another embodiment, it is integrated in section of a movable wall element.

When the rolling arrangement 10 is integrated in a device to be moved, they will together make a system comprising roller devices attached to the device to be moved, and which at least one is a rolling arrangement 10 according to the invention as described above.

If the device to be moved is a chair, each chair leg is equipped with roller devices where three of these may be passive devices comprising only rolling elements, and where one is an active rolling arrangement 10 according to the invention. Other configurations of roller devices are feasible, e.g. two passive roller devices and two active roller arrangements 10. This configuration with provide better control of movements of the chair.

As mentioned the rolling arrangement 10 comprises a wireless receiver 30 for receiving movement instructions for the control device 40 of a rolling arrangement 10. Instructions may for instance be transmitted via a remote control, a tablet or a smart phone with an installed application for controlling different scenarios.

The invention is further defined by a method for autonomously moving at least one device, e.g. furnishing and wall elements, from a first position to a second position along a surface, the method comprises the several steps.

The first steps are providing and integrating roller devices to the device to be moved, which at least one is a rolling arrangement 10 according to the one described above.

The next step is receiving movement instructions in the control device 40 of the rolling arrangement 10 by means of a wireless receiver 30. The control device 40, which is connected to the receiver 30, may comprise a micro-controller interpreting and acting to a transmitted sequence comprising driving instructions.

When the control device 40 of the rolling arrangement 10 receives movement instructions, it will request its position relative to its surroundings from the position device 50. This is current and first position.

When current position is established, movement instruction for controlling the movement of the rolling element 20 is executed in the control device 40. The movements are based on said acquired first position of the rolling arrangement 10 and the received movement instructions comprising a route and a second position.

Based on this, the last step of the method is to move the at least one rolling arrangement 10, attached to the device, from the first to the second position according to the route.

In one embodiment of the inventive method, at least two rolling arrangements 10 are connected to the device to be moved from a first to a second position along a surface. Movement instructions, from for instance a tablet, will then be transmitted to all the rolling arrangements 10.

In one embodiment, a selected rolling arrangement 10 is set to act as a master device controlling the movements of the other rolling arrangements 10 connected to the device to be moved. These will then act as slave devices and respond to instructions from the master device. The master device will then set up a specific route according to received wireless signals and transmit control signals to the slave device instructing it to follow movements according to a specific route.

When several rolling arrangements 10 according to the invention are to be included in a set-up that is to be simultaneously controlled, each rolling arrangement is given a unique ID. In this way, all rolling arrangement 10 can receive individual movement instructions.

When one rolling arrangement 10 is acting as a master for the others, it will control each of the other rolling arrangement 10 connected to same device.

Another embodiment of the invention comprises a method for controlling movements of a group of several devices according to pre-set scenarios. Such devices may for instance include chairs, tables and movable walls.

When setting up this configuration, one rolling arrangement 10 attached to one of the devices in the group is set to act as a master for the others. It will thus coordinate the movements of the other devices comprised in a group. In this way, different scenarios with different movements and plans of the devices can be established.

According to one embodiment of the invention, the following steps are performed for creating and recording a scenario defining movements and routes for the devices comprised in a group of devices to be moved.

The first step is recording a first position information of all rolling arrangements 10 comprised in a group. This position information can be visualized on a screen displaying a room where the devices to be moved are located.

The next step is recording a second position information of all rolling arrangements 10 comprised in a group. This can be done by moving the devices visualized on the screen. For a touch screen, the different devices can be dragged to its new location. After this step, a first and a second position of all the devices comprised in the group are established.

A step of the method is to select one of the rolling arrangements 10 to act as a master for the other rolling arrangements 10 comprised in the group. The order of this step relative to the other steps is not essential.

The last step is setting up a movement path and movement order of the rolling arrangements 10. This is possible by using the unique ID of each rolling arrangement 10.

The whole set-up procedure can be visualized and set on for instance a tablet which may also serve as a remote control by transmitting wireless signals, e.g. by means of Bluetooth. A software application installed in the tablet can show the room and the location of walls and furniture that are to be moved in the room from a first to a second position according to a specific scenario. A user can then drag and drop the different devices visualized on the screen, e.g. by drag/drop gestures of furnishings and walls from a first position to a second position. The program can then, based on the start and stop positions for each device, create specific routes for the devices to follow when they are to move autonomously. Based on this, different scenarios or scenes can be created and stored on the device.

Other types of controlling different set-up scenarios are also feasible, e.g. by voice or gestures, as well as haptic input on other devices than those having a touch screen.

The following are some examples of how the invention can be implemented and used.

According to one scenario, the solution according to the invention can be used for automatically repositioning desks and chairs in a classroom. Different set-up configurations of the desks and chairs can be set, e.g. single or group set-up according to specific scenarios.

This may also be useful when a floor in the classroom is to be cleaned. When cleaning is to be performed, a cleaning scenario can be executed thereby moving all desks and chairs from a typical classroom set-up to a new set-up where the desks and chairs are positioned along the walls, thereby leaving a floor with space free. This scenario may be combined with a cleaning robot programmed to interact with the autonomously moving desks and chairs.

Another possible scenario where the solution according to the present invention can be used is in a conference hall where different set-up scenarios can be easily set according to type of conference. Movable walls may define the number of rooms, e.g. one big room or four smaller rooms. There are endless configurations and possibilities.

Yet another example of how rolling arrangements according to the invention can be used is to integrate one or more rolling arrangements in a pallet. This will provide a movable and controllable pallet. Pallets are typically used for temporary storing of different kinds of goods. When handling pallets, they are moved from one position to another. This or normally done by a truck. By integrating a rolling arrangement according to the invention in a pallet, it can be controlled to move from one position to another along a surface without the need for external devices handling and moving the pallet. Several pallets with rolling arrangements can be controlled according to different scenarios as mentioned above.

Another example is to integrate one or more rolling arrangements in a supporting structure or framework for transporting different product form one location to another along a surface.

The rolling arrangement can be used both indoor and outdoor. It can be used onshore and offshore, e.g. offshore installations such as rigs and on decks of ships.

The rolling arrangement according to the invention can be integrated in a device when the device is produced, or it may be retrofitted in a device not initially intended to be movable. The invention can be used both indoor and outdoor of buildings.

As understood from the different examples of using the rolling arrangement, a skilled person will see other possible areas of application of the present invention made possible by the rolling arrangement 10, thereby enabling autonomous moving of a device from a first position to a second position along a surface.

The invention claimed is:

1. A rolling arrangement configured to be integrated in a device for together making a system enabling autonomous movement of the device from a first position to a second position along a surface, the rolling arrangement comprising:
   a cylindrical sleeve configured to be arranged in the device;
   a housing;
   a rolling element arranged at a first end portion of the housing such that the rolling element is configured to be in contact with the surface when the rolling arrangement is to be moved;
   a wireless receiver and a control device connected to each other;
   a position acquirer connected to the control device for acquiring the first position of the rolling arrangement relative to surroundings thereof;
   a driver connected to the control device and the rolling element for driving and controlling movement of the rolling element according to the first position acquired by the position acquirer, and a received wireless signal comprising movement instructions and the second position; and
   a power supply connected to the wireless receiver, the control device, the position acquirer and the driver,
   wherein the power supply, the wireless receiver, the control device, the position acquirer and the driver are arranged in the housing.

2. The rolling arrangement according to claim 1, further comprising a wireless transmitter connected to the control device.

3. The rolling arrangement according to claim 1, where the driver comprises one or more balls or a chain.

4. The rolling arrangement according to claim 1, further comprising a piston arranged so as to be reciprocally movable in the housing such that the piston can be moved between an upper position in the cylindrical sleeve and a lower position in the cylindrical sleeve, wherein the rolling element is connected to the piston.

5. The rolling arrangement according to claim 1, wherein the rolling arrangement is configured to be integrated in a piece of furniture.

6. The rolling arrangement according to claim 1, wherein the rolling arrangement is configured to be integrated in a movable wall element.

7. The rolling arrangement according to claim 1, wherein the rolling arrangement is configured to be integrated in a pallet.

8. A method for autonomously moving at least one device from a first position to a second position along a surface, the method comprising:
   integrating a rolling arrangement in the at least one device, for together making a system and arranging the rolling arrangement so as to be in contact with the surface when the at least one device is to be moved, wherein the rolling arrangement comprises a cylindrical sleeve arranged in the at least one device, a housing, a rolling element arranged at a first end portion of the housing such that the rolling element is configured to be in contact with the surface when the rolling arrangement is to be moved, a wireless receiver and a control device connected to each other, a position acquirer connected to the control device for acquiring the first position of the rolling arrangement relative to surroundings thereof, and a driver connected to the control device and the rolling element for driving and controlling movement of the rolling element;
   receiving movement instructions in the control device using the wireless receiver;
   acquiring the first position using the position acquirer;
   executing at least one of the movement instructions in the control device for controlling the movement of the rolling element, wherein the movement of the rolling element is based on the first position and the movement instructions comprise a route and a second position; and
   moving the rolling arrangement integrated in the at least one device from the first position to the second position according to the route.

9. The method according to claim 8, wherein:
   the rolling arrangement is one of at least two rolling arrangements integrated in the at least one device; and
   the method further comprises arranging a first of the at least two rolling arrangements to act as a master for controlling movement of a second of the at least two rolling arrangements.

10. The method according to claim 8, wherein:
    the at least one device comprises two or more devices comprised in a group of devices to be moved in an area and the rolling arrangement is a first of a plurality of rolling arrangements respectively integrated in the group of devices; and the method further comprises arranging the first of the plurality of rolling arrangements to act as a master for controlling movement of a second of the plurality of rolling arrangements.

11. The method according to claim 10, movements of the group of devices are controlled according to pre-set scenarios.

12. The method according to claim 11, where at least one pre-set scenario is established by:
recording first position information of the plurality of rolling arrangements;
recording second position information of the plurality of rolling arrangements; and
setting up a movement path and a movement order of the plurality of rolling arrangements.

13. The method according to claim 8, wherein movement of the rolling arrangement is controlled using a remote control.

14. The method according to claim 13, wherein the remote control is controlled by voice, gestures or haptic input.

* * * * *